No. 628,820. Patented July 11, 1899.
H. A. LAMPLUGH.
BICYCLE, &c.
(Application filed Dec. 15, 1897.)
(No Model.) 3 Sheets—Sheet 1.

Witnesses:— Inventor:—

No. 628,820. Patented July 11, 1899.
H. A. LAMPLUGH.
BICYCLE, &c.
(Application filed Dec. 15, 1897.)

(No Model.) 3 Sheets—Sheet 2.

Witnesses:—
Richard Skerrett
Arthur John Powell

Inventor:—
Henry Arthur Lamplugh

No. 628,820. Patented July 11, 1899.
H. A. LAMPLUGH.
BICYCLE, &c.
(Application filed Dec. 15, 1897.)
(No Model.) 3 Sheets—Sheet 3.
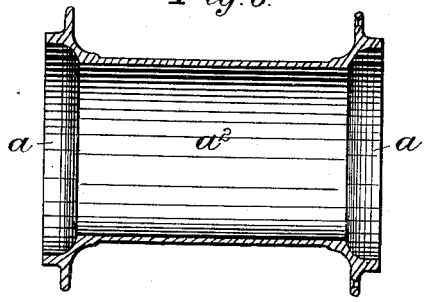
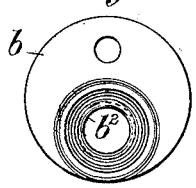 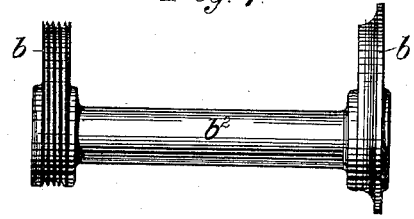 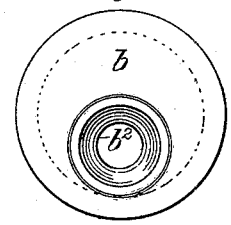
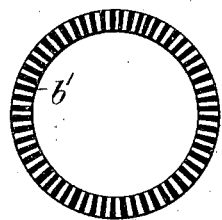  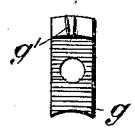
Witnesses:—
Richard Sperrett
Arthur John Powell
Inventor:—
Henry Arthur Lamplugh

UNITED STATES PATENT OFFICE.

HENRY ARTHUR LAMPLUGH, OF BIRMINGHAM, ENGLAND.

BICYCLE, &c.

SPECIFICATION forming part of Letters Patent No. 628,820, dated July 11, 1899.

Application filed December 15, 1897. Serial No. 662,033. (No model.)

*To all whom it may concern:*

Be it known that I, HENRY ARTHUR LAMPLUGH, a subject of the Queen of Great Britain, residing at Birmingham, England, have invented certain new and useful Improvements in Bicycles, Tricycles, and other Velocipedes and Motor-Carriages; and I do hereby declare that the following is a full, clear, and exact description of the invention, which will enable others skilled in the art to which it appertains to make and use the same.

My invention has for its object to prevent the sudden jerk in the velocipede or motor-carriage to which it is liable when the wheel or wheels of the velocipede or motor-carriage encounter an obstruction on the road or surface on which the vehicle is traveling.

I will describe my invention in connection with a safety-bicycle.

The steering-wheel is connected to the fork in the ordinary manner; but I dispense with the ordinary hub in the wheel, in which hub the ends of the spindle ordinarily take a bearing. In place of the ordinary hub I employ metallic rings, in which the inner ends of the spokes of the wheel are fixed. On each end of the spindle is a loose cylindrical flanged roller, which rollers take a bearing on the interior of the said rings, so that when the vehicle is in use the spindle of the steering-wheel is eccentric to the circumference of the said wheel, being a short distance below the center of the wheel.

Figure 1:
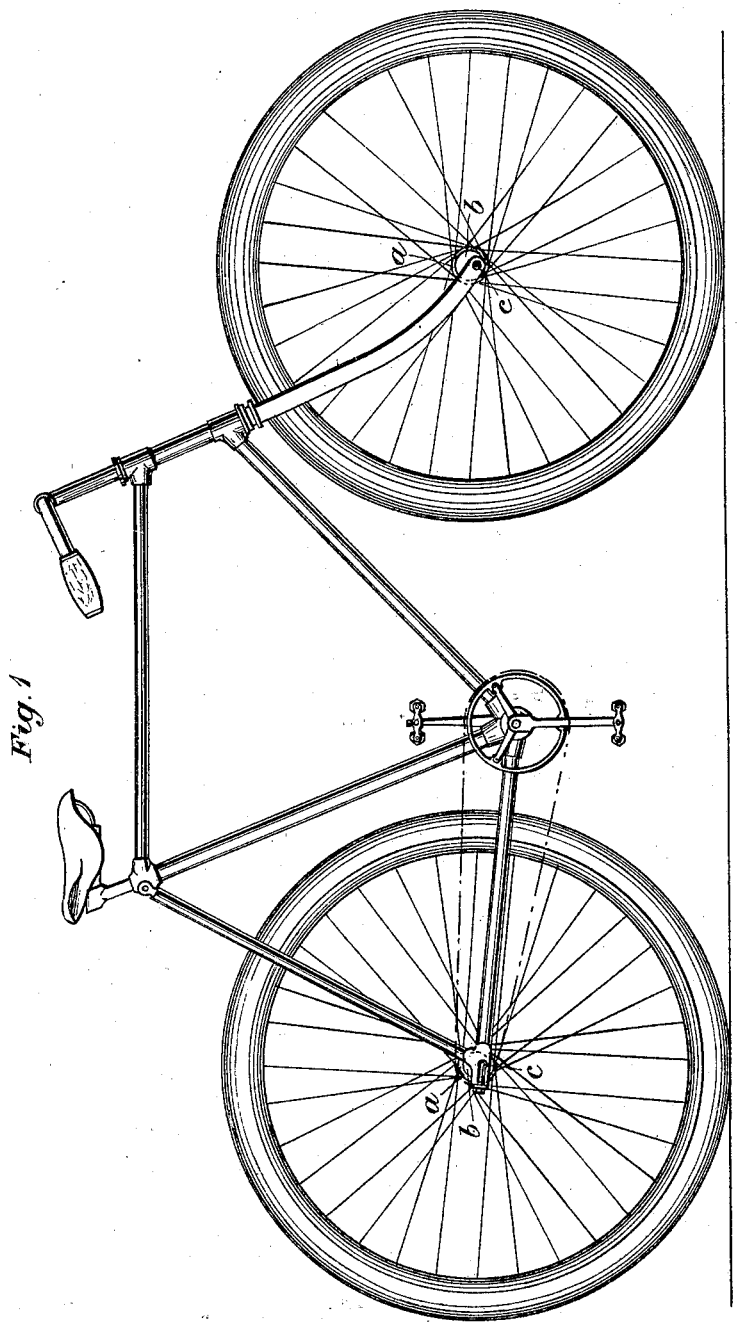
Figure 4:
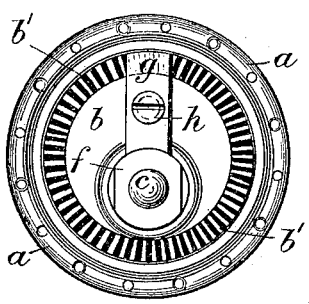
Figure 2:
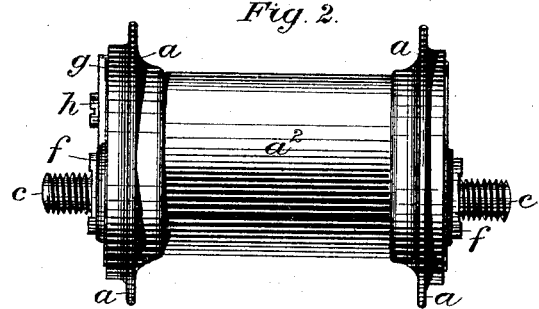
Figure 3:
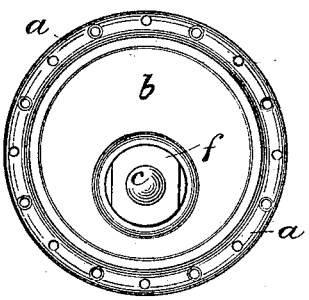
Figure 5:
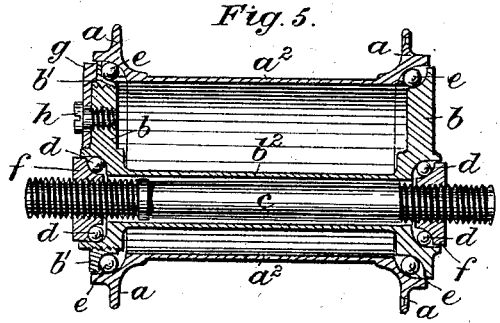

Figure 1 of the accompanying drawings represents in side elevation a safety-bicycle containing my improvements. Fig. 2 represents a front elevation, and Figs. 3 and 4 represent elevations at opposite sides of the hub of the front or steering wheel of the said safety-bicycle; and Fig. 5 represents the said hub in section. Figs. 6, 7, 8, 9, 10, 11, and 12 represent parts of the said hub detached.

The same letters of reference indicate the same parts in the several figures of the drawings.

In carrying my invention into effect I form the rings $a\ a$, to which the inner ends of the spokes are to be connected at the ends of and in one piece with the barrel or hub $a^2$ of the wheel, as is illustrated in the detached sectional view of the said hub, Fig. 6. I arrange within the said rings $a\ a$ of the hub two loose rollers $b\ b$, the said rollers being carried eccentrically by a tubular sleeve $b^2$, (see Figs. 7, 8, and 9,) through which the spindle $c$ of the wheel passes. The said loose rollers $b\ b$ and sleeve $b^2$ are represented detached in Figs. 7, 8, 9, and 10.

It will be seen by reference to Fig. 5 that the several bearings of the improved hub— namely, the bearings of the hub $a\ a^2\ a$ on the rollers $b\ b$, as well as those of the rollers $b\ b$ on the spindle $c$—are provided with antifriction-balls or spheres marked, respectively, $e\ e$ and $d\ d$, the balls $d\ d$ being kept in place by the adjustable cones $f\ f$ on the screwed ends of the spindle $c$.

To permit of the assemblage of the parts, as well as the adjustment from time to time of the bearings to compensate for wear, one of the rollers $b$ (preferably that at the left-hand side of the hub, as shown in Figs. 5 and 7 of the drawings) is made in two parts, marked, respectively, $b\ b'$, the part $b$ being of a diameter somewhat less than the interior of the part $a^2$ of the hub and the other or ring part $b'$ (shown separately in Figs. 10 and 11) screwing on the part $b$ after the same has been passed through the part $a^2$ of the hub. The balls $e\ e$ of the bearings of the hub having been inserted in the ball-races, the adjustment of the said bearings is effected by the final screwing up or adjustment of the ring part $b'$ of the roller $b\ b'$. The adjusted ring $b'$ is locked in position by a key $g$, (shown separately in Fig. 12,) the rib or projection $g'$ of which key takes into one or other of the series of notches in the outer face of the ring $b'$ of the roller $b\ b'$. This key consists of a strip or bar of metal having one end concaved, so as to seat upon the periphery of the cone $f$, as shown in Figs. 4 and 5, in which position its projection $g'$ will be in position to engage the notches in the ring part $b'$. The key $g$ is secured to the part $b$ of the roller $b\ b'$ by a screw $h$.

Although I prefer the construction described and represented of the loose rollers $b\ b$, yet I do not limit myself thereto, as the rollers $b\ b$ at both ends of the sleeve $b^2$ may be constructed alike—that is, of two parts $b\ b'$—or both rollers may be made each of one piece of metal, but separate from the sleeve $b^2$, in which case the ball-bearing cups terminating the ends of the sleeve $b^2$ are preferably screw-threaded externally, and the rollers $b\ b$ are made to screw thereon, being locked in position after adjustment by locking screw-nuts or equivalent devices passed onto the ends of the said ball-bearing cups.

In applying my improvements to the rear or driving wheel of a safety-bicycle the ring $a$ at the right-hand side of the hub is provided with a tubular extension or flange externally screwed, to which the toothed or chain wheel is attached in a way similar to that employed in the attaching of the chain-wheel to an ordinary driving-wheel hub.

On the traveling of the safety-bicycle described and represented on a smooth or even surface the hub of each wheel rotates on the loose flanged rollers $b\ b$, but the flanged rollers $b\ b$ resting on the interior of the rings $a\ a$ of the hub the said rollers are capable of rolling on the said interiors of the rings $a\ a$ with practically no friction. When one or other of the wheels comes in contact with an obstacle—say a large pebble on the road—the said wheel being lifted its rings $a\ a$ describe a curve about a center, which center is the summit of the pebble or obstacle. In consequence of the complete isolation of the spindle $c$ from the hub of the wheel the flanged rollers $b\ b$ on the ends of the spindle $c$ slide or roll on the interiors of the rings instead of being brought suddenly to rest or nearly to rest and the shock which occurs when a safety-bicycle of the ordinary construction encounters an obstacle is prevented, a gentle ascent and descent of the rider occurring when the bicycle is compelled to pass over an obstacle.

The application of my invention to velocipedes other than safety-bicycles, as well as to motor-carriages, differs in no essential respect from its application to a safety-bicycle as hereinbefore described.

In heavy vehicles—such, for example, as motor-carriages—ball-bearings may be replaced by roller-bearings, or the bearings may be plain—that is, without devices for reducing friction.

Having now particularly described and ascertained the nature of my invention and in what manner the same is to be performed, I declare that I claim as my invention—

1. In a bicycle, the combination with a wheel-spindle, of a pair of disks eccentrically mounted thereon and maintained at all times in fixed eccentric position with respect thereto, a sleeve connecting said disks loose upon but surrounding said spindle throughout its length, and a cylindrical barrel or hub surrounding and having bearings on said disks.

2. In a bicycle, the combination with a wheel-spindle, of a sleeve loose on but surrounding said spindle throughout its length and provided at its ends with eccentric disks formed in one piece with said sleeve the said disks being held in fixed eccentric relation to said spindle, a barrel or hub having integral rings at its open ends, ball-bearings between the disks and said rings, a ring part of greater diameter than the barrel adapted to be attached to the exterior of one of the disks, the latter being of reduced diameter, an independent, detachable key one end of which seats on one of the cones, the other end having a projection on its inner face to engage one of a series of notches on the ring part, and a screw passing through said key between its ends and tapping into the disk on which the ring part is mounted, substantially as described.

HENRY ARTHUR LAMPLUGH. [L. S.]

Witnesses:
RICHARD SKERRETT,
ARTHUR JOHN POWELL.